(12) United States Patent
Taylor

(10) Patent No.: US 11,867,417 B2
(45) Date of Patent: Jan. 9, 2024

(54) ON-SITE CONTROLLER FOR AN HVAC SYSTEM

(71) Applicant: James Eric Taylor, El Centro, CA (US)

(72) Inventor: James Eric Taylor, El Centro, CA (US)

( * ) Notice: Subject to any disclaimer, the term of this patent is extended or adjusted under 35 U.S.C. 154(b) by 407 days.

(21) Appl. No.: 16/943,842

(22) Filed: Jul. 30, 2020

(65) Prior Publication Data

US 2020/0355388 A1 Nov. 12, 2020

Related U.S. Application Data

(63) Continuation-in-part of application No. 15/428,643, filed on Feb. 9, 2017, now abandoned.

(51) Int. Cl.
| | |
|---|---|
| *F24F 11/46* | (2018.01) |
| *F24F 11/00* | (2018.01) |
| *F24F 11/64* | (2018.01) |
| *F24F 11/65* | (2018.01) |
| *G05B 19/042* | (2006.01) |
| *F24F 110/10* | (2018.01) |
| *F24F 110/20* | (2018.01) |

(Continued)

(52) U.S. Cl.
CPC .......... *F24F 11/46* (2018.01); *F24F 11/0008* (2013.01); *F24F 11/64* (2018.01); *F24F 11/65* (2018.01); *G05B 19/042* (2013.01); *F24F 2110/10* (2018.01); *F24F 2110/12* (2018.01); *F24F 2110/20* (2018.01); *F24F 2110/22* (2018.01); *F24F 2130/10* (2018.01); *F24F 2140/50* (2018.01); *F24F 2140/60* (2018.01); *G05B 2219/2614* (2013.01)

(58) Field of Classification Search
CPC ........ F24F 11/46; F24F 11/0008; F24F 11/64; F24F 11/65; F24F 2110/10; F24F 2110/12; F24F 2110/20; F24F 2110/22; F24F 2130/10; F24F 2140/50; F24F 2140/60; F24F 11/88; F24F 11/63; G05B 19/042; G05B 2219/2614
See application file for complete search history.

(56) References Cited

U.S. PATENT DOCUMENTS

| | | | |
|---|---|---|---|
| 2,782,612 A | 2/1957 | Spiegelhalter | |
| 3,175,775 A | 3/1965 | Wurtenberg | |

(Continued)

FOREIGN PATENT DOCUMENTS

| | | | | |
|---|---|---|---|---|
| CN | 205372918 | * | 7/2016 | .............. F24F 11/00 |
| JP | H0814402 | * | 2/1996 | .............. F24F 7/007 |

*Primary Examiner* — Christopher E. Everett
*Assistant Examiner* — Olvin Lopez Alvarez
(74) *Attorney, Agent, or Firm* — Neil K. Nydegger

(57) ABSTRACT

An on-site controller for an HVAC system is operated to maintain temperature and humidity set points inside an enclosed facility. A weather station inside the facility records microclimate data pertinent to environmental conditions inside the facility, and a weather station outside the facility records microclimate data pertinent to meteorological conditions outside the facility. A summing network compares the inside microclimate data with the outside meteorological data to establish an actuating signal. A throttle, responsive to the actuating signal, varies the power demand for the HVAC system to maintain the predetermined set points for environmental conditions inside the facility.

19 Claims, 4 Drawing Sheets

(51) Int. Cl.
  *F24F 110/22* (2018.01)
  *F24F 130/10* (2018.01)
  *F24F 140/50* (2018.01)
  *F24F 140/60* (2018.01)
  *F24F 110/12* (2018.01)

(56) References Cited

U.S. PATENT DOCUMENTS

| | | | |
|---|---|---|---|
| 4,494,406 A | 1/1985 | Komons | |
| 4,510,576 A | 4/1985 | MacArthur | |
| 4,611,470 A | 9/1986 | Enstrom | |
| 4,653,334 A | 3/1987 | Capone | |
| 4,860,598 A | 8/1989 | Bailey | |
| 4,885,914 A | 12/1989 | Pearman | |
| 4,946,650 A | 8/1990 | Rothele | |
| 5,105,366 A * | 4/1992 | Beckey | G05D 23/1931 |
| | | | 236/91 C |
| 5,568,385 A * | 10/1996 | Shelton | H04N 7/025 |
| | | | 348/E7.017 |
| 5,791,408 A | 8/1998 | Seem | |
| 5,920,827 A * | 7/1999 | Baer | G01W 1/06 |
| | | | 702/3 |
| 5,955,682 A | 9/1999 | Faircloth | |
| 6,066,194 A | 5/2000 | Hugghins | |
| 6,128,910 A | 10/2000 | Faircloth | |
| 6,152,998 A | 11/2000 | Taylor | |
| 6,402,822 B1 | 6/2002 | Najm | |
| 6,596,059 B1 | 6/2003 | Greist | |
| 6,694,764 B1 | 2/2004 | Eckstein | |
| 6,713,986 B1 | 3/2004 | Jayadev | |
| 6,925,363 B2 | 8/2005 | Hutton | |
| 7,062,361 B1 | 6/2006 | Lane | |
| 7,373,222 B1 | 5/2008 | Wright | |
| 8,151,578 B1 | 4/2012 | Morales | |
| 8,178,997 B2 | 5/2012 | Talkin | |
| 8,538,595 B2 * | 9/2013 | Lyren | G05B 13/026 |
| | | | 700/291 |
| 8,556,188 B2 * | 10/2013 | Steinberg | H04Q 9/00 |
| | | | 236/51 |
| 8,770,492 B2 * | 7/2014 | Jang | F24F 11/30 |
| | | | 236/46 C |
| 9,569,804 B2 * | 2/2017 | Stein | H02J 3/003 |
| 2004/0254654 A1 | 12/2004 | Donnelly et al. | |
| 2005/0279110 A1 | 12/2005 | Zeng | |
| 2006/0036350 A1 | 2/2006 | Bohrer et al. | |
| 2007/0024229 A1 | 2/2007 | Caro | |
| 2007/0044553 A1 * | 3/2007 | Gillette | G01W 1/00 |
| | | | 73/170.16 |
| 2008/0245083 A1 | 10/2008 | Tutunoglu | |
| 2009/0240381 A1 | 9/2009 | Lane | |
| 2010/0076606 A1 | 3/2010 | Gatley | |
| 2010/0154448 A1 | 6/2010 | Hay | |
| 2010/0251766 A1 | 10/2010 | Rauch | |
| 2011/0153090 A1 * | 6/2011 | Besore | G05B 15/02 |
| | | | 700/278 |
| 2011/0166913 A1 | 7/2011 | Buchanan | |
| 2011/0172831 A1 | 7/2011 | Kreft | |
| 2011/0247718 A1 * | 10/2011 | Samain | B01F 35/2205 |
| | | | 141/94 |
| 2011/0276527 A1 | 11/2011 | Pitcher | |
| 2011/0306288 A1 | 12/2011 | Murayama | |
| 2012/0065805 A1 | 3/2012 | Montalvo | |
| 2012/0079425 A1 | 3/2012 | Grabinger | |
| 2012/0101646 A1 | 4/2012 | Nydegger et al. | |
| 2012/0101651 A1 | 4/2012 | Haynes | |
| 2012/0166003 A1 | 6/2012 | Taylor | |
| 2012/0273581 A1 | 11/2012 | Kolk | |
| 2013/0090769 A1 | 4/2013 | McKie | |
| 2013/0098597 A1 | 4/2013 | Fujimoto | |
| 2013/0105104 A1 | 5/2013 | Wiley | |
| 2013/0134962 A1 | 5/2013 | Kamel | |
| 2014/0084817 A1 * | 3/2014 | Bhavaraju | B60L 50/40 |
| | | | 307/46 |
| 2014/0096946 A1 | 4/2014 | Rognli | |
| 2015/0142991 A1 * | 5/2015 | Zaloom | H04N 21/436 |
| | | | 709/248 |
| 2015/0162784 A1 * | 6/2015 | Kydd | B60L 53/20 |
| | | | 307/9.1 |
| 2015/0276253 A1 | 10/2015 | Montalvo | |
| 2016/0025578 A1 | 1/2016 | Meirav | |
| 2016/0061473 A1 | 3/2016 | Johnson | |
| 2016/0103442 A1 | 4/2016 | Lyu | |
| 2016/0103475 A1 | 4/2016 | Lee | |
| 2016/0195887 A1 | 7/2016 | Shiel | |
| 2016/0226254 A1 * | 8/2016 | Cheng | H02J 3/40 |
| 2016/0246268 A1 | 8/2016 | ElBsat | |
| 2016/0281723 A1 | 9/2016 | Zhang | |
| 2016/0290675 A1 * | 10/2016 | Hashino | F24F 11/30 |
| 2016/0313752 A1 | 10/2016 | Przybylski | |
| 2016/0348936 A1 | 12/2016 | Johnson | |
| 2016/0364313 A1 | 12/2016 | Roth | |
| 2016/0370026 A1 | 12/2016 | Denton | |
| 2017/0016642 A1 | 1/2017 | Spalink | |
| 2017/0074533 A1 | 3/2017 | Ji | |
| 2017/0176954 A1 | 10/2017 | Salsbury | |
| 2017/0329357 A1 | 11/2017 | Torres | |
| 2017/0343228 A1 | 11/2017 | Dyess | |
| 2018/0031261 A1 | 2/2018 | Bentz | |
| 2018/0031267 A1 | 2/2018 | Hern | |
| 2018/0172302 A1 | 6/2018 | Jang | |
| 2018/0180340 A1 | 6/2018 | Jones | |
| 2018/0209675 A1 | 7/2018 | Ridder | |
| 2018/0328612 A1 | 11/2018 | Sinha | |
| 2018/0328619 A1 * | 11/2018 | Beilfuss | F24F 11/58 |
| 2019/0024917 A9 | 1/2019 | Taylor | |
| 2019/0293308 A1 | 9/2019 | Salsbury | |

* cited by examiner

ON-SITE CONTROLLER FOR AN HVAC SYSTEM

This application is a continuation-in-part of application Ser. No. 15/428,643, filed Feb. 9, 2017, which is currently pending. The contents of application Ser. No. 15/428,643 are incorporated herein by reference.

FIELD OF THE INVENTION

The present invention pertains to controllers for Heating-Ventilating-Air-Conditioning (HVAC) systems. In particular, the present invention pertains to controllers for operating HVAC systems to maintain optimal temperature and humidity set points within an enclosed facility. More particularly, the present invention pertains to the operation of an HVAC system based on microclimate conditions at the facility. The present invention is particularly, but not exclusively, useful as a controller for controlling the power demand of an HVAC system based on the difference between on-site, microclimate measurements taken respectively inside and outside an enclosed facility.

BACKGROUND OF THE INVENTION

HVAC systems are manufactured to have predetermined operational capabilities. Typically, within these capabilities, an HVAC system will be rated in accordance with its ability to process (i.e. heat, cool and/or dehumidify) a prescribed volume of air, within a predetermined temperature range, for a defined period of time. However, once an HVAC system has been installed for operation at a specified site, its operational efficiency is always significantly impacted by various external factors. Specifically, each of these factors results from a characteristic of the site where the HVAC system is installed (e.g. climate, building structure, ducting, power grid regulations, etc.).

Not surprisingly, it happens that the operational capabilities of any HVAC system will change over time. Importantly, such changes can result from either systemic or external factors, or a combination of the two. In any event, it is important to at least periodically monitor the operational condition of an installed HVAC system in order to identify ways by which an operation of the system can be improved. For example, U.S. Pat. No. 6,128,910 which issued for an invention entitled "Diagnostic Unit for an Air Conditioning System", and which is assigned to Enalasys Corporation, is suitable for this purpose.

In addition to the operational capabilities of the HVAC system, and the conditions at the site where it is installed, it is also typically the case that different locations within a particular site will have different temperature requirements that are specific for each location. Stated differently, each operational site has its own unique HVAC requirements. Moreover, as implied above, power grid regulations and operating costs always need to be considered whenever an HVAC system is installed.

It is axiomatic that the cost of electric power charged by a power company is determined by the demand for electric power. Insofar as HVAC systems are concerned, this demand is primarily dependent on the rating of the HVAC system that is being used at a facility, and the meteorological conditions at the local site where the HVAC system is located.

Typically, the cost of electric power is based on meteorological measurements taken at a predetermined location within the extended geographical area and is determined by the power company servicing the area. Thus, all facilities within the service area are charged based on a same power demand profile that has been created by the power company. The local site and the predetermined location used by the power company to create the power demand profile may, however, have substantially different climatic conditions.

It is not surprising that a consequence of using a same generalized power demand profile to establish a uniform cost basis for purchasing electric power at all sites within an extended geographical area is often problematic. For instance, different sites within the area may experience substantially different meteorological conditions. Moreover, as noted above, they may even be in different climatic zones. In any event, the local demand at a facility can, and often will, differ from the demand profile established by the power company. The result here is that the cost for power may not align with the operational requirements of an HVAC system at its location.

For purposes of this disclosure, an enclosed facility is any structure or structure complex that is serviced by a single HVAC system. Thus, an enclosed facility can include several different structures, and each structure can have its own environmental control. With this in mind, the present invention considers an enclosed facility to be an office building, an apartment complex, an industrial plant, a home, a department store, a school/university, government buildings, a restaurant, an entertainment venue or any similar type structural complex. In summary, an enclosed facility will be any enclosure that effectively creates its own microclimate.

An important consideration for the present invention is the relative climatic/environmental conditions at three separately identified locations, within an extended geographical area, which are being served by a same power company. These are: i) the location used by a power company for the purpose of establishing its power demand profile; ii) the on-site meteorological/microclimate conditions at any given time immediately outside an enclosed facility; and iii) the microclimate environmental conditions inside the enclosed facility.

For purposes of the present invention, the cost for electric power that is based on a power demand profile created by a power company is taken as a given. The end-user, however, (i.e. the consumer) has no control over this cost. Nevertheless, due to microclimate conditions outside an enclosed facility, the power demand of an HVAC system at the facility may be less than what is anticipated by the power demand profile being used by the power company.

It is well known that microclimate conditions outside an enclosed facility will have a direct effect on microclimate conditions inside the enclosed facility. Because of this relationship, knowledge of both inside and outside microclimate conditions at a local site can be helpful. Specifically, additional data points can be used for data collection to more accurately control the operation of an HVAC system. In particular, the user can control his/her costs by adjusting operational power requirements for the HVAC system based on actual local data, rather than a power demand profile based on data at a distant location.

In light of the above, it is an object of the present invention to provide systems and methods for customizing Heating-Ventilating-Air-Conditioning (HVAC) systems for operation at a specific site. Another object of the present invention is to customize HVAC systems in accordance with a predetermined environmental/operational benchmark which has been established based on environmental considerations pertinent to a particular site, and on the operational capabilities provided by the manufacturer of the HVAC equipment. Yet another object of the present invention is to provide an on-site controller for controlling the operational power requirements of an HVAC system that is installed at an enclosed facility and influenced only by on-site local conditions. Another object of the present invention is to operate an HVAC system with the minimum power requirements needed to mitigate on-site meteorological conditions immediately outside an enclosed facility. Still another object of the present invention is to provide systems and methods for customizing a particular site with a specific HVAC system which is easy to install, is simple to operate, and is comparatively cost effective.

SUMMARY OF THE INVENTION

In accordance with the present invention, an apparatus is provided for customizing a closed air Heating-Ventilating-Air-Conditioning (HVAC) system. In particular, as envisioned for the present invention, the HVAC system will be installed at a predetermined site and the apparatus will be customized for an efficacious operation at the site. For this purpose, a database is compiled and used for defining a benchmark. More specifically, the defined benchmark establishes limits for environmental conditions which are acceptable at the site. The benchmark also sets operating ranges $R_{(1-n)}$ for an efficient operation of the HVAC system at the site.

Structurally, in addition to the HVAC system, the present invention employs an m number of environmental sensors and an n number of diagnostic sensors. In particular, each environmental sensor is positioned at a predetermined location in the site to obtain sensible measurements. These measurements are then used as environmental data $e_{(1-m)}$. Collectively, the environmental data $e_{(1-m)}$ defines an environmental condition at the site. As mentioned above, the present invention also employs an n number of diagnostic sensors. Each diagnostic sensor is incorporated into the HVAC system to measure respective enthalpies $h_{(1-n)}$ at predetermined locations in the HVAC system. These measurements are then used as diagnostic data. Collectively, the diagnostic data $h_{(1-n)}$ determines an operational condition of the HVAC system at the site. Preferably, the collection of diagnostic data is accomplished in accordance with the disclosure of U.S. Pat. No. 6,128,910, mentioned above.

For an operation of the present invention, a computer is connected to each of the m number of environmental sensors, to each of the n number of diagnostic sensors, and to the database. With these connections the computer uses the predefined benchmark to evaluate changes in the operational conditions of the HVAC system. Specifically, the present invention is focused on changes in the operational conditions of the HVAC system that occur in response to changes in environmental conditions at the site. Based on these evaluations, corrective actions are identified which are necessary for an optimally safe and efficient operation of the HVAC system.

As intended for the present invention, the benchmark includes benchmark enthalpies $h_{b(1-n)}$ which are established for a rated operation of the HVAC system in compliance with the established environmental conditions at the site. Within this framework, changes in an operational condition of the HVAC system are indicated by deviations $\Delta_{(1-n)}$ of the diagnostic data from the benchmark enthalpies (i.e. $\Delta_n = h_{bn} - h_n$). Importantly, a necessary corrective action for the HVAC system is indicated when any deviation $\Delta_{(1-n)}$ is outside its respective acceptable range $R_{(1-n)}$, as established for the benchmark. For example, an appropriate corrective action may require adjusting the operating point of a fan in the HVAC system or, perhaps, a complete shutdown of the fan. Another appropriate corrective action may require adjusting the operating point of a compressor in the HVAC system or, alternatively, a complete shutdown of the compressor.

In addition to the components for the present invention disclosed above, it also includes a system controller which is connected to the computer, to the HVAC system, and to a public utility. In this combination, the system controller implements a corrective action for the HVAC system in response to instructions from either the computer or from the utility. Insofar as control of the computer is concerned, the system controller handles computer control as disclosed above. However, insofar as a response to utility control is concerned, actions by the system controller are effectively driven by cost considerations.

For an interaction of the system controller with a utility, a permanent sensor is connected and installed in the HVAC system. The purpose here is for the permanent sensor to measure kilowatt-hours (kWh) for the fan, and also kWh for the compressor of the HVAC system. For these connections, the permanent sensor is programmed with a base line which is fixed on the established environmental condition. Generally, the system controller will honor demands from the utility. It will, however, ignore a demand corrective action from the utility unless all environmental conditions established for the site can be satisfied.

Additional aspects and capabilities for the system controller of the present invention are provided by a chip included with the system controller for establishing a two-way wireless communications link between the system controller and the utility, and between the system controller and a remote site. In particular, this communications link is established to receive information from the utility, or the remote site, for implementing operational compliance of the system with price point controls established by the utility. Additionally, in order to identify corrective actions necessary for an optimal performance of the HVAC system, the system controller can be employed to prepare a periodic report for this purpose. Specifically, the report will be based on the deviations $\Delta_{(1-n)}$ of the diagnostic data from the benchmark enthalpies ($\Delta_n = h_{bn} - h_n$) relative to respective acceptable ranges $R_{(1-n)}$, and to changes in kWh measurements of operational components of the HVAC system.

For another aspect of the present invention, an on-site controller is provided for an HVAC system that is installed at an enclosed facility and operated by power from an external power source, e.g. a power company or an Independent System Operator (ISO). Included with the controller is a control unit which is connected directly with the HVAC system. In this combination, the control unit operates the HVAC system in a manner that will maintain predetermined temperature and humidity set points inside the facility. To do this, the control unit specifically monitors the power demand requirements of the HVAC system for operational and environmental compliance with a predefined benchmark. As envisioned for the present invention the enclosed facility will typically be an office building, an apartment complex, an industrial plant, a home, a department store, a school/university, government buildings, restaurant and entertainment venues.

An important consideration for this aspect of the present invention is that it includes an internal weather station which is located inside the facility. The purpose of this internal weather station is to record internal microclimate data that are pertinent to environmental conditions inside the facility. Also included is an external weather station which is located outside the facility for recording external meteorological data that are pertinent to microclimate conditions directly affecting the facility. Both the internal microclimate data and the external meteorological data are provided as input to a summing network which is connected with the control unit.

In detail, the summing network is connected to the internal weather station, and to the external weather station for comparing the recorded internal microclimate data with the recorded external microclimate data. Based on this microclimate data comparison (i.e. inside environmental v. outside meteorological), an actuating signal is created using well known closed loop feedback control theories. The import here is that the actuating signal is used to influence the environmental microclimate inside the enclosed facility by adjusting power demand requirements of the HVAC system. As recognized by the present invention, these demand requirements are dependent on both the desired environmental conditions inside the facility and the meteorological condition surrounding the enclosed facility.

To vary the power demand requirements of the HVAC system, a throttle is controlled by the control unit. Operationally the throttle is responsive to the actuating signal from the summing network. It is with this actuating signal that the power demand of the HVAC system from the external power source is determined. Thus, only the power that is needed is used to maintain the predetermined set points for environmental conditions inside the facility.

As envisioned for the present invention, the internal microclimate weather station for recording environmental microclimate data includes a thermometer for measuring air temperature inside the facility, and an hygrometer for measuring humidity inside the facility. Similarly, the external microclimate weather station for recording meteorological data includes a thermometer for measuring air temperature and an hygrometer for measuring humidity outside the facility. The external microclimate weather station may, however, also include a barometer for measuring atmospheric pressure, and an anemometer for measuring wind speed.

As an additional feature, the HVAC system may include a storage battery which is connected to the summing network. If included, the storage battery will be available for receiving and storing excess power from the source of power (power company), whenever it is available at a cost savings. Preferably, power storage occurs when power costs are low, for subsequent use when power costs are high.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
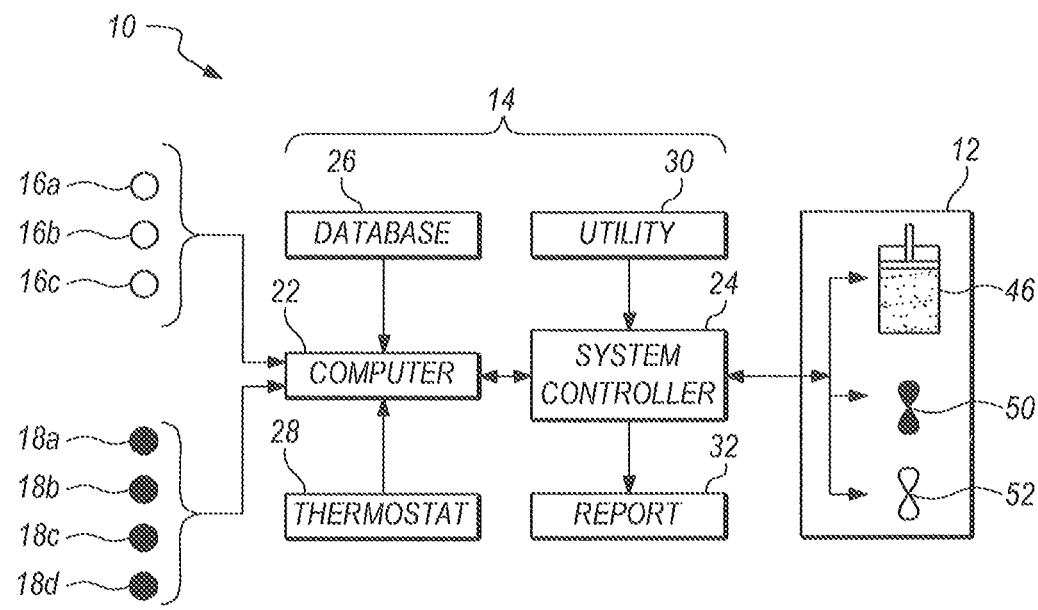
FIG. 1 is a functional flow chart showing the tasks/components required by the present invention for implementing a corrective action affecting the HVAC system.

Referring initially to FIG. 1, an apparatus for customizing air flow in an environment is shown and is generally designated 10. As shown, the apparatus 10 includes a closed air, Heating-Ventilating-Air-Conditioning (HVAC) system 12 of a type well known in the pertinent art. Also, FIG. 1 shows that the apparatus 10 includes a control unit 14 which is connected to the HVAC system 12. Additionally, the apparatus 10 includes a plurality of environmental sensors 16, of which the sensors 16a, 16b and 16c are exemplary; and a plurality of diagnostic sensors 18, of which the sensors 18a, 18b, 18c and 18d are exemplary.

Figure 2:
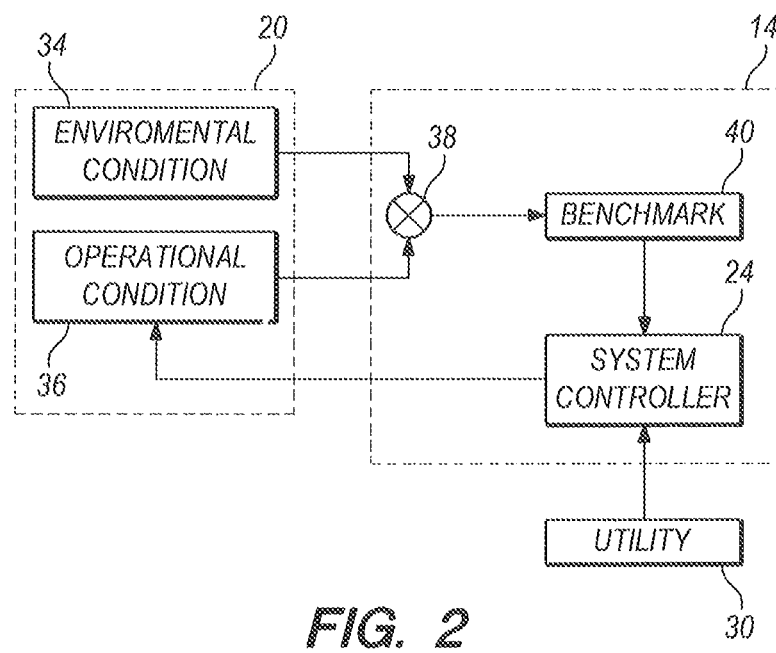
FIG. 2 is a schematic diagram of an apparatus for customizing a closed air Heating-Ventilating-Air-Conditioning (HVAC) system in accordance with the present invention.
Figure 3:
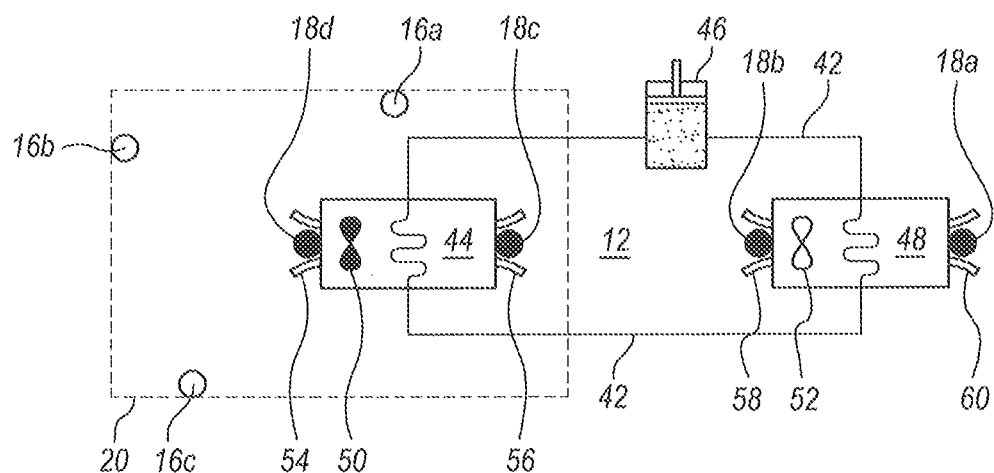
FIG. 3 is a layout of the basic operational components for an HVAC system, with interactive sensors shown incorporated in accordance with the present invention.

For purposes of the present invention, the environmental sensors 16a-c are to be positioned at selected locations inside a site 20 (see FIGS. 2 and 3). At the site 20, the environmental sensors 16a-c measure both a temperature and a humidity at each of their respective locations in the site 20. Further, as shown in FIG. 3, the diagnostic sensors 18a-d are employed with the HVAC system 12 at the site 20. Operationally, the diagnostic sensors 18a-d are individually used to measure an enthalpy h, which is based on a dry bulb temperature and a relative humidity. For purposes of the present invention, the enthalpies h are measured at predetermined locations on the HVAC system 12. Specifically, locations for the diagnostic sensors 18 on the HVAC system 12 are disclosed below, in detail, with reference to FIG. 3.

Returning to FIG. 1, it will be seen that the control unit 14 includes a computer 22 and a system controller 24. FIG. 1 also shows that the computer 22 is electronically connected to receive respective inputs from a database 26, a thermostat 28, the plurality of environmental sensors 16, and the plurality of diagnostic sensors 18. In this combination, input from the database 26 to the computer 22 includes information regarding operational capabilities of the HVAC system 12, as rated by the particular manufacturer. Also included in the database 26 is information concerning desired environmental considerations for the site 20, such as acceptable ranges for the temperature and humidity at different locations within the site 20. Additionally, centralized input into the computer 22 from the thermostat 28 is provided to establish desired operating points for the HVAC system 12, which are based on real time measurements that are taken by the environmental sensors 16a-c and the diagnostic sensors 18a-d.

The system controller 24 shown in FIG. 1 is responsive to both the computer 22 and to a utility 30. Specifically, the system controller 24 uses output from the computer 22 to monitor and control the HVAC system 12. For purposes of controlling the HVAC system 12, however, the system controller 24 is also responsive to the utility 30 (e.g. a public grid). In particular, the control of the HVAC system 12 that is required by the utility 30 is provided to implement operational compliance mandates, and to conform an operation of the HVAC system 12 to predetermined price point controls. FIG. 1 also indicates that the system controller 24 will periodically prepare a report 32 that can be transmitted to a remote, oversight control facility (not shown).

Referring back to FIGS. 2 and 3, it is to be appreciated that the environmental sensors 16 which are positioned in the site 20 collectively define an environmental condition 34 for the present invention. Likewise, it is to be appreciated that the diagnostic sensors 18 which are placed at predetermined locations on the HVAC system 12 collectively define an operational condition 36 for the present invention. FIG. 2 also indicates that both the environmental condition 34 and the operational condition 36 are sent to a summary recorder 38 in the computer 22 of the control unit 14. As disclosed in detail below, it is an important feature of the present invention that the environmental condition 34 and the operational condition 36 are used together by the summary recorder 38 to create a benchmark 40 for an operation of the present invention.

With reference to FIG. 3, it will be seen that the HVAC system 12 essentially includes a fluid line 42 which interconnects various operational components of the HVAC system 12. In particular, arranged along the fluid line 42 in the direction of fluid flow are an evaporator 44, a compressor 46, a condenser 48 and a return to the evaporator 44. Further, the evaporator 44 is shown to include an evaporator fan 50, and the condenser 48 is shown to include a condenser fan 52. Additionally, the evaporator 44 has an evaporator inlet 54 and an evaporator outlet 56. Similarly, the condenser 48 has an intake 58 and an exhaust 60. As envisioned for the present invention, the HVAC system 12 operates in a manner that is well known in the pertinent art.

Importantly, for purposes of the present invention, the HVAC system 12 includes a diagnostic sensor 18a which is shown positioned at the exhaust 60 of the condenser 48, and a diagnostic sensor 18b which is positioned at its intake 58. Additionally, the HVAC system 12 includes a diagnostic sensor 18c which is positioned at the outlet 56 of the evaporator 44, and a diagnostic sensor 18d which is positioned at its inlet 54. Insofar as the environmental sensors 16a-c are concerned, they are shown randomly dispersed throughout the site 20, as required.

In accordance with the present invention, an m number of environmental sensors 16 are respectively positioned at predetermined locations in the site 20. Their primary function is to obtain sensible measurements from the environment of site 20 which can be used as environmental data $e_{(1-m)}$ to collectively determine the environmental condition 34 ($\Sigma e_{(1-m)}$) at the site 20. Also, an n number of diagnostic sensors 18 are incorporated into the HVAC system 12 to measure enthalpies $h_{(1-n)}$ at predetermined locations in the HVAC system 12. Their collective function is to obtain enthalpy data which collectively determine the operational condition 36 ($\Sigma h_{(1-n)}$) of the HVAC system 12.

As noted above, an important feature of the present invention is the creation and use of a database 26 which defines a benchmark 40. In particular, the benchmark 40 establishes parameters for the environmental condition 34 at the site 20. In particular, this is accomplished by setting acceptable operating ranges $R_{(1-n)}$ for the operational condition 36 of the HVAC system 12.

For an operation of the present invention, the computer 22 is connected directly to the m number of environmental sensors 16, and to the n number of diagnostic sensors 18. Using these connections, the computer 22 compares changes in the operational condition 36 ($\Sigma h_{(1-n)}$) of the HVAC system 12 that are responsive to changes in the environmental condition 34 ($\Sigma e_{(1-m)}$) at the site 20. This comparison is then evaluated with reference to the benchmark 40 that is defined by the database 26. Next, the results of this comparison are transmitted from the computer 22 to the system controller 24 where whatever corrective actions are necessary for an optimal performance of the HVAC system 12 are taken.

Figure 4:
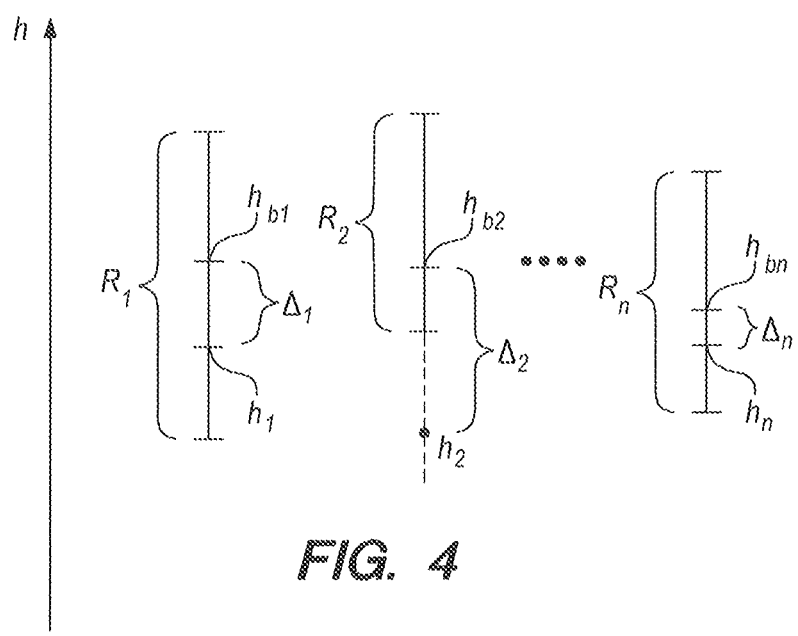
FIG. 4 is a representative graphical presentation of exemplary benchmark enthalpies for different sensors of the present invention, which collectively establish an operational benchmark for the present invention, wherein enthalpies measured by the sensors at an operational site are shown relative to an acceptable operating range for enthalpy deviations from the benchmark enthalpies.

As implied above, the benchmark 40 includes benchmark enthalpies $h_{b(1-n)}$ which are established within acceptable operating ranges $R_{(1-n)}$. Specifically, the acceptable operating ranges $R_{(1-n)}$ are identified relative to the operational condition 36 of the HVAC system 12. They must, however, be identified for compliance with the environmental condition 34. With this in mind, and with reference to FIG. 4, it will be appreciated that changes in the operational condition 36 of the HVAC system 12 are indicated by deviations $\Delta_{(1-n)}$ of the diagnostic data from the benchmark enthalpies ($\Delta_n = h_{bn} - h_n$). Accordingly, a necessary corrective action for the HVAC system 12 is indicated when a deviation $\Delta_{(1-n)}$ is outside its respective acceptable range $R_{(1-n)}$. For example, as envisioned for the present invention, corrective actions can include adjusting an operating point, or causing the complete shutdown, of a fan (e.g. evaporator fan 50 or condenser fan 52) in the HVAC system 12. A corrective action may also involve adjusting the operating point, or causing the complete shutdown, of the compressor 46.

Additional features for the present invention include a permanent sensor (not shown) in the HVAC system 12 which will be used to measure kilowatt-hours (kWh) for the fans (e.g. evaporator fan 50 or condenser fan 52) and for the compressor 46. When used, the permanent sensor is programmed with a base line, and the base line is fixed relative to the environmental condition 34. In response to input from the permanent sensor (via computer 22), the system controller 24 will implement an appropriate corrective action for the HVAC system 12. The system control 24 may, however, ignore a demand corrective action from the utility 30 when the environmental condition 34 that is established for the site 20 cannot be satisfied.

Another feature for the present invention involves a chip (not shown) for establishing two-way wireless communications links between the system controller 24 and the utility 30 and/or with a remote site. In particular, such wireless connections are convenient for receiving information which may be needed for implementing operational compliance and price point control requirements. Further, it is envisioned that the system controller 24 will prepare a periodic report 32 that provides information concerning the deviations $\Delta_{(1-n)}$ from the benchmark enthalpies ($\Delta_n = h_{bn} - h_n$) relative to respective acceptable ranges $R_{(1-n)}$, and to changes in kWh measurements. It is also envisioned that the periodic reports 32 are monitored by the system controller 24 at a remote site, and are used by the system controller 24 to identify corrective actions necessary for an optimal performance of the HVAC system.

Figure 5:
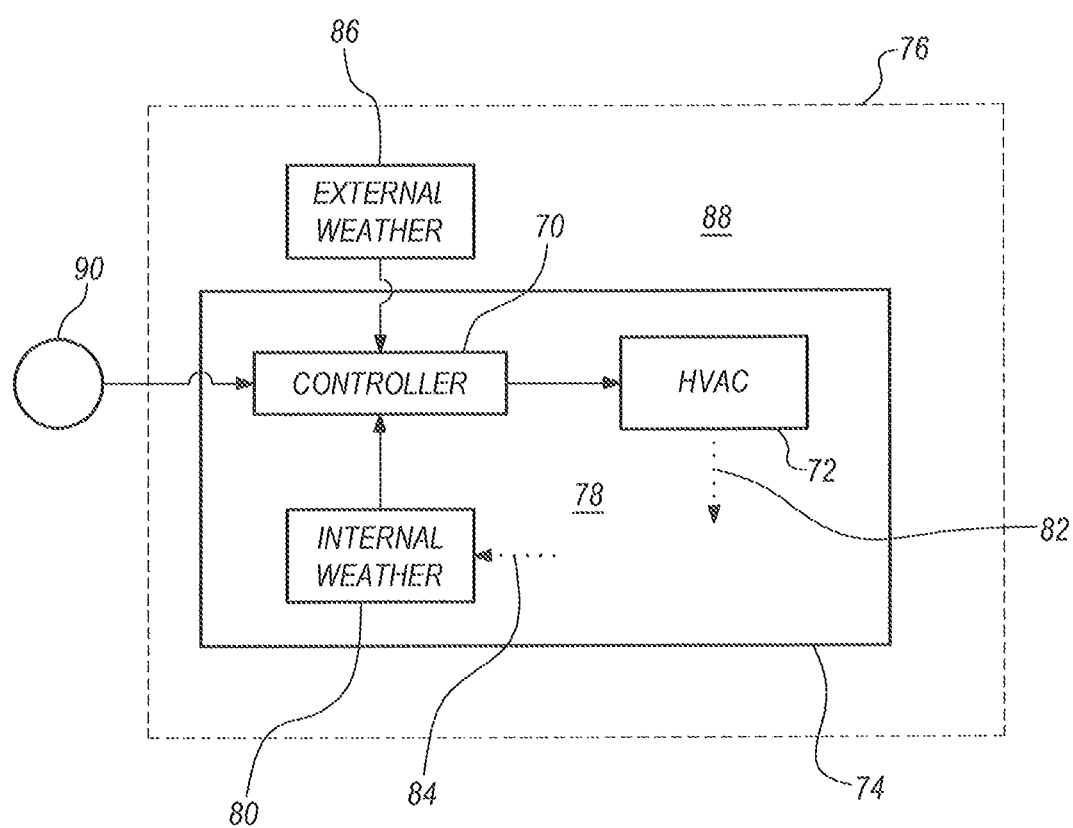
FIG. 5 is a schematic presentation showing critical elements for the present invention at respective locations within an extended geographical area serviced by an Independent System Operator (ISO)

With reference to FIG. 5. It will be seen that a preferred embodiment of the present invention includes a controller 70 that operates an HVAC system 72 which is located at an enclosed facility 74. For purposes of disclosure, the enclosed facility 74 is shown located at a site 76 where it is subject to existing meteorological conditions. As envisioned for the present invention the enclosed facility 74 may be a single structure or it may be a multi-complex structure. In either case, an enclosed facility 74 will include all structures that are being serviced by a same HVAC system 72. Further, the site 76 will include the enclosed facility 74 as well as the environs immediately surrounding the enclosed facility 74 within a same climatic zone.

As envisioned for the present invention, the enclosed facility 74 will establish its own environmental microclimate 78 that will be measured by an internal weather station 80 located inside the enclosed facility 74. As shown, the microclimate 78 will be directly influenced by supply air 82 (shown by a dotted line) that is provided for the enclosed facility 74 by the HVAC system 72. In FIG. 5, return air 84 (shown by a dotted line) is measured by the internal weather station 80 before it is returned to the HVAC system 72.

It is also envisioned for the present invention that an external weather station 86 will be positioned at the site 76, near the enclosed facility 74. The purpose of the external weather station 86 is to measure an on-site meteorological microclimate 88. As intended for the present invention, the influence of the meteorological microclimate 88, outside the enclosed facility 74, on environmental microclimate 78, inside the enclosed facility 74, is the determinative factor for controlling an operation of the HVAC system 72. Stated differently, the difference between the inside environmental microclimate 78 and the outside meteorological microclimate 88 is used by the present invention to determine the actual power demand requirements for an efficient HVAC system 72 operation. As implied above, this difference may provide a cost savings on power provided by an external power source (ISO) 90.

Figure 6:
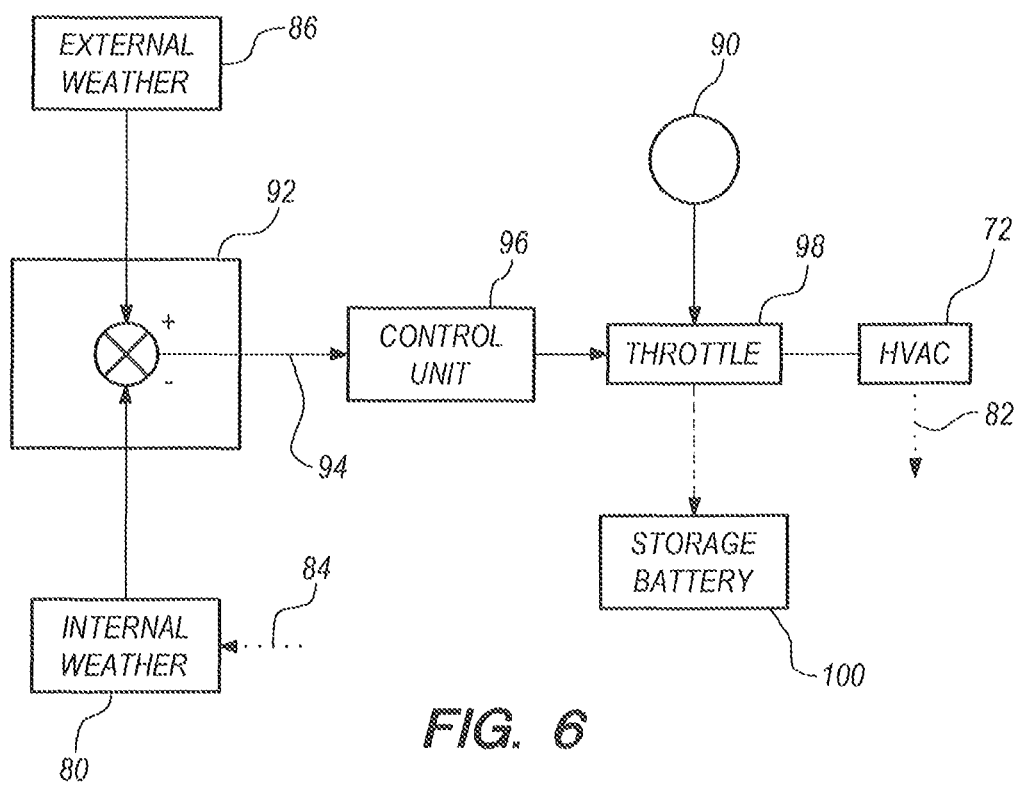
FIG. 6 is a functional block diagram of a closed-loop control system for controlling the operation of an HVAC system.

With reference to FIG. 6 it will be appreciated that for an operation of the present invention, data from the internal weather station 80 is compared with data from the external weather station 86 at a summing network 92 in the controller 70. The result of this comparison is an actuating signal 94 that is sent to a control unit 96, also in the controller 70. Functionally, this actuating signal 94 indicates when the HVAC system 72 is properly powered and, if not, whether the HVAC system 72 requires more, or less, power to operate efficiently. As shown in FIG. 6, in response to the actuating signal 94 the control unit 96 controls a throttle 98 that meters the power to be received from the external power source 90 by the HVAC system 72, to thereby establish a proper power level for an operation of the HVAC system 72. It is also indicated in FIG. 6 that any excess power that is received from the power source 90 can be selectively diverted, by the throttle 98, to a storage battery 100. Such a diversion may be desirable when actual power requirements for operating the HVAC system 72 are low, and the cost of power is also low.

Figure 7:
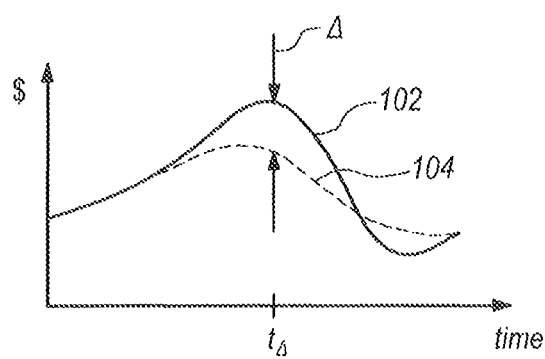
FIG. 7 is a graph depicting exemplary costs between a power demand profile provided by a power company (i.e. ISO) and a contemporaneous power demand required to actually operate an HVAC system at an on-site facility.

With reference to FIG. 7, and by way of example, it will be appreciated that a cost differential Δ can be determined by comparing a power demand profile 102 (which has been established by the ISO using meteorological data at a remote site) with the actual demand curve 104 for an operation of the HVAC system 72 (which is established by comparing the inside microclimate 78 with the outside microclimate 88). Suffice to say here, the Δ may be beneficially exploited for the advantage of a user of an HVAC system 72.

While the particular On-site Controller for an HVAC System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A climate control monitor for maximizing operational cost efficiencies at an enclosed facility, the monitor comprising:
   an HVAC system installed at the facility, wherein the HVAC system is operated with electric power from an external power source with operational costs based on a predetermined power demand profile set by the external power source;
   an internal weather station located inside the facility to record internal microclimate data for temperature and humidity pertinent to microclimate environmental conditions inside the facility;
   an external weather station located outside the facility to record external data for temperature and humidity pertinent to on-site, microclimate, meteorological conditions outside the facility;
   a summing network connected to the internal weather station and to the external weather station for comparing the internal microclimate data with the external microclimate data;
   a control unit to establish an actual demand signal for operating the HVAC system based on a comparison of the microclimate data comparison, wherein the control unit is connected with the summing unit to comply with the actual demand signal for operating the HVAC system and to the external power source, wherein the control unit is configured to determine a first cost curve for the actual demand signal over a predetermined time period and to determine a second cost curve for the predetermined power demand profile, and further determine a cost differential between the first and second cost curves, the cost differential representing an area representative of relative costs for operating the HVAC system; and
   a throttle connected with the control unit, wherein the throttle is controlled according to the actual demand signal established by the control unit to regulate power supplied to operate the HVAC system and a controlled by the control unit to divert an excess amount power determined based on the cost differential to a storage battery for future use and while a cost of energy is low.

2. The monitor of claim 1 wherein the internal microclimate weather station for recording environmental microclimate data comprises:
   a thermometer for measuring air temperature inside the facility; and
   an hygrometer for measuring humidity inside the facility.

3. The monitor of claim 1 wherein the external microclimate weather station for recording meteorological data comprises:
   a thermometer for measuring air temperature;
   an hygrometer for measuring humidity;
   a barometer for measuring atmospheric pressure; and
   an anemometer for measuring wind speed.

4. The monitor of claim 1 wherein the external power source is an Independent System Operator (ISO).

5. The monitor of claim 1 wherein the enclosed facility is selected from the group consisting of an office building, an apartment complex, an industrial plant, a home, a department store, a school/university, government buildings, restaurants and entertainment venues.

6. The monitor of claim 1 further comprising a storage battery connected with the throttle for receiving and storing excess power from the external power source, when available.

7. The monitor of claim 1 further comprising:
an m number of environmental sensors connected with the internal microclimate weather station, wherein each environmental sensor is positioned at a predetermined location in the facility to obtain temperature and humidity measurements $e_{(1-m)}$ for use as recorded internal microclimate data;
an n number of diagnostic sensors, wherein each diagnostic sensor is incorporated into the HVAC system to measure respective enthalpies $h_{(1-n)}$ at predetermined locations in the HVAC system for use as diagnostic data, wherein the diagnostic data determine an operational condition of the HVAC system; and
a database included in the control unit for defining a benchmark, wherein the benchmark establishes limits for the environmental condition inside the facility, and sets operating ranges $R_{(1-n)}$ for the operational condition of the HVAC system.

8. The monitor of claim 7 wherein the benchmark includes benchmark enthalpies $h_{b(1-n)}$ established for a rated operation of the HVAC system in compliance with the established environmental condition, wherein a change in the operational condition of the HVAC system is indicated by deviations $\Delta_{(1-n)}$ of the diagnostic data from the benchmark enthalpies ($\Delta_n = h_{bn} - h_n$), and wherein necessary corrective action is indicated when a deviation $\Delta_{(1-n)}$ is outside its respective acceptable range $R_{(1-n)}$.

9. The monitor of claim 8 wherein the corrective actions include adjusting an operating point of a fan in the HVAC system, to include a shutdown of the fan, and adjusting an operating point of a compressor in the HVAC system, to include a shutdown of the compressor.

10. An on-site climate control monitor for maximizing operational cost efficiencies at an enclosed facility, the monitor comprising:
an HVAC system installed at the facility, wherein the HVAC system is operated with electric power from an external power source with operational costs based on a predetermined power demand profile set by the external power source;
a control unit connected with the HVAC system for receiving internal microclimate data for temperature and humidity pertinent to environmental conditions inside the facility and external data for temperature and humidity pertinent to on-site, microclimate, meteorological conditions immediately outside the facility;
a summing network connected to the control unit for comparing the internal microclimate data with the external microclimate data, wherein based on the comparison, the control unit establishes an actual demand signal for power to operate the HVAC system, wherein the control unit is configured to determine a first cost curve for the actual demand signal over a predetermined time period and to determine a second cost curve for the predetermined power demand profile, and further to determine a cost differential between the first and second cost curves, the cost differential representing an area representative of relative costs for operating the HVAC system; and
a throttle to regulate power supplied to the HVAC system according to the actual demand signal while diverting excess power to a battery based on the cost differential and when a cost of energy is low.

11. The monitor of claim 10 further comprising:
an internal weather station located inside the facility for recording the internal microclimate data pertinent to environmental conditions inside the facility; and
an external weather station located outside the facility for recording the external data pertinent to on-site, microclimate, meteorological conditions immediately outside the facility.

12. The monitor of claim 11 wherein the internal microclimate weather station for recording environmental microclimate data comprises:
a thermometer for measuring air temperature inside the facility; and
an hygrometer for measuring humidity inside the facility.

13. The monitor of claim 12 wherein the external microclimate weather station for recording meteorological data comprises:
a thermometer for measuring air temperature;
an hygrometer for measuring humidity;
a barometer for measuring atmospheric pressure; and
an anemometer for measuring wind speed.

14. The controller monitor of claim 11 further comprising:
an m number of environmental sensors connected with the internal microclimate weather station, wherein each environmental sensor is positioned at a predetermined location in the facility to obtain temperature and humidity measurements $e_{(1-m)}$ for use as recorded internal microclimate data;
an n number of diagnostic sensors, wherein each diagnostic sensor is incorporated into the HVAC system to measure respective enthalpies $h_{(1-n)}$ at predetermined locations in the HVAC system for use as diagnostic data, wherein the diagnostic data determine an operational condition of the HVAC system; and
a database included in the control unit for defining a benchmark, wherein the predefined benchmark establishes limits for the environmental condition inside the facility, and sets operating ranges $R_{(1-n)}$ for the operational condition of the HVAC system.

15. The monitor of claim 14 wherein the benchmark includes benchmark enthalpies $h_{b(1-n)}$ established for a rated operation of the HVAC system in compliance with the established environmental condition, wherein a change in the operational condition of the HVAC system is indicated by deviations $\Delta_{(1-n)}$ of the diagnostic data from the benchmark enthalpies ($\Delta_n = h_{bn} - h_n$), and wherein necessary corrective action is indicated when a deviation $\Delta_{(1-n)}$ is outside its respective acceptable range $R_{(1-n)}$.

16. The monitor of claim 15 wherein the corrective actions include
adjusting an operating point of a fan in the HVAC system, to include a shutdown of the fan, and adjusting an operating point of a compressor in the HVAC system, to include a shutdown of the compressor.

17. A method for monitoring a Heating-Ventilating-Air-Conditioning (HVAC) system installed at an enclosed facility, the method comprising the steps of:
installing an HVAC system at the facility, wherein the HVAC system is operated with electric power from an external power source with operational costs based on a predetermined power demand profile set by the external power source;
providing a control unit connected with the HVAC system for receiving internal microclimate data for temperature and humidity pertinent to environmental conditions inside the facility and external data for temperature and humidity pertinent to on-site, microclimate, meteorological conditions immediately outside the facility;

comparing the internal microclimate data with the external microclimate data, wherein the control unit establishes an actual demand signal based on the microclimate data comparison;

determining a first cost curve for the actual demand signal over a predetermined time period, determining a second cost curve for the predetermined power demand profile and determining a cost differential between the first and second cost curves, the cost differential representing an area representative of relative costs for operating the HVAC system; and controlling a throttle with the control unit, wherein the control unit controls the throttle according to the actual demand signal to regulate power supplied to operate the HVAC system according to the actual demand signal and to divert an excess amount power determined based on the cost differential to a storage battery for future use and while a cost of energy is low.

18. The method of claim 17 further comprising the steps of: positioning an m number of environmental sensors, wherein each environmental sensor is positioned at a predetermined location in the facility to obtain temperature and humidity measurements $e_{(1-m)}$ for use as recorded internal microclimate data;

incorporating an n number of diagnostic sensors into the HVAC system to measure respective enthalpies $h_{(1-n)}$ at predetermined locations in the HVAC system for use as diagnostic data, wherein the diagnostic data determines the actual demand for an operational condition of the HVAC System; and including a database in the control unit for defining a benchmark, wherein the predefined benchmark establishes limits for the environmental condition inside the facility, and sets operating ranges $R_{(1-n)}$ for the operational condition of the HVAC system.

19. The method of claim 18 wherein the benchmark includes benchmark enthalpies $h_{b(1-n)}$ established for a rated operation of the HVAC system in compliance with the established environmental condition, wherein a change in the operational condition of the HVAC system is indicated by deviations $\Delta_{(1-n)}$ of the diagnostic data from the benchmark enthalpies ($\Delta_n = h_{bn} - h_n$), and wherein necessary corrective action is indicated when a deviation $\Delta_{(1-n)}$ is outside its respective acceptable range $R_{(1-n)}$.

* * * * *